May 9, 1933.   N. T. HARRINGTON   1,907,800
REAR VISION DEVICE FOR CLOSED BODY AUTOMOBILES
Filed July 8, 1929

INVENTOR
Norman T. Harrington
BY Whittemore Hulbert
Whittemore & Belknap
ATTORNEYS Patented May 9, 1933

1,907,800

UNITED STATES PATENT OFFICE

NORMAN T. HARRINGTON, OF CLEVELAND, OHIO

REAR VISION DEVICE FOR CLOSED BODY AUTOMOBILES

Application filed July 8, 1929. Serial No. 376,616.

In the present state of the art it is usual to provide closed body automobiles with rear vision mirrors which are located above the windshield beneath the vehicle top. Such mirrors are placed at proper angles so that from the driver's position the reflection is seen through the rear window of the car. However, with certain constructions and particularly with certain types of coupes the upper edge of the window is considerably lower than the mirror. This limits the vision which can be obtained through the mirror to a comparatively short distance in the rear of the car.

The object of the present invention is to obtain a construction applicable to such cars by means of which the driver will have a rear vision unlimited as to distance back of the car. This I accomplish by using in conjunction with the rear vision mirror a rear window which will refract the light entering the car slightly in an upper direction so as to compensate for the depression of its level below that of the mirror. The invention therefore consists in the construction as hereinafter set forth:

As indicated in the diagram, A is the car body having a windshield B and a rear window C, the upper edge of which is below the upper edge of the windshield. D is a rear vision mirror which is located above the windshield and which is tilted at the proper angle to refract the light entering through the window C to the position E of the driver's eye. If, however, the ordinary plain glass window were used for C, the downward angle of the mirror to the window would be such as to greatly limit the observable distance in rear of the car.

My improvement consists essentially in substituting for a plain glass window, one which will refract the light rays in an upward direction. This may be accomplished by use of a slightly prismed glass having its thicker portion at the top and tapering toward the bottom. Only a slight angle or prisming of the glass is required to sufficiently raise the light rays so that horizontal rays entering the car at the top of the window will fall upon the surface of the mirror. Thus with my improved construction, the driver can observe objects to the rear however far distant.

The construction as above described may be used with the ordinary plain glass mirror located above the windshield. Preferably, however, I use a mirror that is slightly convex, the co-action with the prism window being the same in both constructions.

Figure 1:
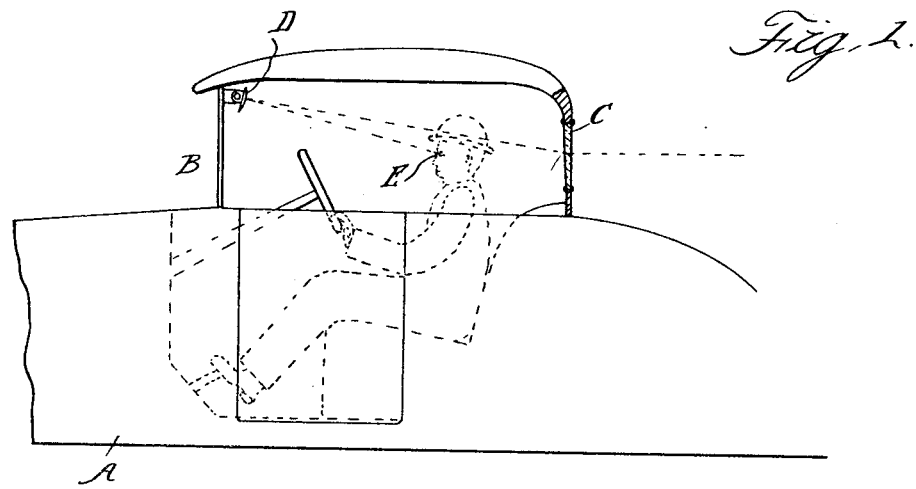
Figure 1 shows diagrammatically a closed body car on which my improvement is applied.
Figure 2:
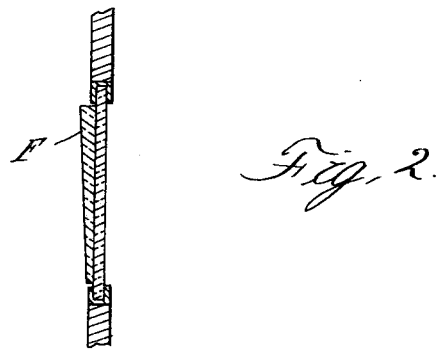
Figure 2 is a vertical cross section through the rear window of a car showing a modified construction.

In Figure 2 I have shown the modified construction in which the rear window is formed of plain glass of uniform thickness to which is attached by cement or otherwise a wedge shaped glass F. This would facilitate the installation of my improvement on cars which have already been equipped with the usual plain glass rear window.

What I claim as my invention is:

1. The combination with a closed body of an automobile provided with a windshield and a rear window opening having its upper edge below the top of said windshield, of a rear vision mirror located above the top of said windshield and a downwardly tapering plane face prism window in said window opening adapted to refract the rays entering through the same in an upward direction at a uniform predetermined angle.

2. The combination with a closed body of an automobile having a depressed window opening in the rear thereof, of a rear vision mirror arranged above the level of the upper edge of said window opening and a downwardly tapering plane face prism window in said opening to refract the light rays entering therethrough in an upward direction at a uniform predetermined angle to fall upon said mirror without distortion of the reflected image.

3. The combination with a closed body of an automobile having a rear window opening, the upper edge of which is depressed a considerable distance below the body top, of a rear vision mirror arranged above the level of the upper edge of said opening and a downwardly tapering plane face prismed window in said opening for refracting horizontal rays entering through the same at the upper edge of the opening in an upward direction at a uniform pretermined angle so as to fall upon said mirror without distortion of the reflected image.

4. The combination with a closed body of an automobile having a plain glass rear window, the upper edge of which is depressed below the body top, of a rear vision mirror arranged above the level of the upper edge of said glass and a downwardly tapering plane face prism glass attached to said plain glass and adapted to refract horizontal rays entering therethrough in an upward direction at a uniform predetermined angle so as to fall upon said mirror without distortion of the reflected image.

In testimony whereof I affix my signature.

NORMAN T. HARRINGTON.